United States Patent
Fabrikant et al.

(10) Patent No.: US 9,251,369 B2
(45) Date of Patent: *Feb. 2, 2016

(54) PRIVACY SELECTION BASED ON SOCIAL GROUPS

(71) Applicant: Google Inc., Mountain View, CA (US)

(72) Inventors: Alexander Fabrikant, Palo Alto, CA (US); Kristen Lefevre, San Francisco, CA (US); Gagan Aggarwal, Mountain View, CA (US); Yaron Singer, Berkeley, CA (US); Nitish John Korula, New York, NY (US); Kevin Snow McCurley, San Jose, CA (US); Lujun Fang, Ann Arbor, MI (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,161

(22) Filed: Oct. 27, 2014

(65) Prior Publication Data

US 2015/0047056 A1  Feb. 12, 2015

Related U.S. Application Data

(63) Continuation of application No. 13/559,549, filed on Jul. 26, 2012, now Pat. No. 8,875,308.

(51) Int. Cl.
*G06F 21/00* (2013.01)
*G06F 21/62* (2013.01)
*H04L 29/06* (2006.01)
*G06F 3/0482* (2013.01)
*G06F 3/0484* (2013.01)

(52) U.S. Cl.
CPC .......... *G06F 21/6245* (2013.01); *G06F 3/0482* (2013.01); *G06F 3/04847* (2013.01); *H04L 63/104* (2013.01)

(58) Field of Classification Search
CPC ... H04L 63/10; H04L 63/102; G06F 21/6245; G06F 21/60
See application file for complete search history.

(56) References Cited

U.S. PATENT DOCUMENTS

2011/0029566 A1* 2/2011 Grandison et al. ............ 707/783
2012/0331396 A1* 12/2012 Coletrane et al. ............. 715/751

OTHER PUBLICATIONS

Fang, et al., "Privacy Wizards for Social Networking Sites," 2010, retrieved from <http://infosec.pku.edu.cn/~p2p/slides/%5bWWW10%5dPrivacy%20Wizards%20for%20Social%20Networking%20Sites_slides.ppt>.

Liu, "A Framework for Computing the Privacy Scores of Users in Online Social Networks," Sep. 11, 2009, retrieved from <http://www.csee.umbc.edu/~kunliu1/research/kunliu_privacy_score_stanford_0911.pdf>.

Maximilien, et al., "Privacy-as-a-Service: Models, Algorithms, and Results on the Facebook Platform," 2009, retrieved from <http://www.almaden.ibm.com/cs/projects/iis/hdb/Publications/papers/priv_w2sp.pdf>.

(Continued)

*Primary Examiner* — Edward Zee
(74) *Attorney, Agent, or Firm* — McDermott Will & Emery LLP (57) ABSTRACT

A method of setting privacy level values for a user. The method includes receiving a designation of a relative privacy level for the user and receiving a selection of a group of other users for the user. Plural sets of privacy level values are associated with the group of other users. The method also includes setting privacy level values for the user based on the designation of the relative privacy level and the plural sets of privacy level values associated with the selected group of other users.

20 Claims, 5 Drawing Sheets

(56) References Cited

OTHER PUBLICATIONS

Shehab, et al., "Learning based access control in online social networks," WWW 2010 Poster, Apr. 2010 Proceedings of the 19th International Conference on World Wide Web pp. 1179-1180.

Talukder, et al., "Privometer: Privacy Protection in Social Networks," 2010, retrieved from <http://www.cs.purdue.edu/homes/ake/pub/Privometer.pdf>.

* cited by examiner

PRIVACY SELECTION BASED ON SOCIAL GROUPS

CROSS-REFERENCE TO RELATED APPLICATION

The present application is a continuation application of U.S. patent application Ser. No. 13/559,549, entitled "PRIVACY SELECTION BASED ON SOCIAL GROUPS," filed on Jul. 26, 2012, issued as U.S. Pat. No. 8,875,308, the contents of which are hereby incorporated by reference in their entirety for all purposes.

BACKGROUND

The present disclosure generally relates to setting privacy levels based on social groups.

User interfaces for setting privacy levels can be complex. A user may have to set multiple different privacy level values, for example regarding sharing personal information such as name, address, phone numbers, and email addresses, sharing other profile information, and sharing photographs or videos with other users. Some interfaces permit an overall designation of a general level of privacy, for example ranging from "high" to "low." However, the meanings of these general levels may not correspond to user expectations.

SUMMARY

In one innovative aspect, the disclosed subject matter can be embodied in a method that includes receiving a designation of a relative privacy level for the user and receiving a selection of a group of other users for the user. Plural sets of privacy level values are associated with the group of other users. The method also includes setting privacy level values for the user based on the designation of the relative privacy level and the plural sets of privacy level values associated with the selected group of other users.

In another innovative aspect, the disclosed subject matter can be embodied in a system that includes one or more processors and a machine-readable medium including instructions stored therein. When executed by the one or more processors, the instructions cause the processors to perform operations that include receiving a designation of a relative privacy level for the user and receiving a selection of a group of other users for the user. Plural sets of privacy level values are associated with the group of other users. The operations also include verifying that the group of other users includes at least a predetermined number of the other users, and in a case that the group of other users includes at least the predetermined number of the other users, setting privacy level values for the user based on the designation of the relative privacy level and the plural sets of privacy level values associated with the selected group of other users.

In a further innovative aspect, the disclosed subject matter can be embodied in a machine-readable medium including instructions stored therein, which when executed by a machine, cause the machine to perform operations that include receiving a designation of a relative privacy level for the user and receiving a selection of a group of other users for the user. Plural sets of privacy level values are associated with the group of other users. The operations also include setting privacy level values for the user to be at least as private as the relative privacy level applied to the plural sets of privacy level values associated with the selected group of other users.

In various aspects, the designation of the relative privacy level can be a percentage value or a relative description, the selection of the group of the other users can include selection from various sized groups of the other users, and the various sized groups of the other users can include one or more of friends, friends of friends, users within a political entity, cultural groups, experts, or all other users for whom the associated privacy level values are available.

In some aspects, the various methods and operations of the subject technology can also include presenting, for display to the user, an interface that includes a first element that includes options for the designation of the relative privacy level and a second element that includes options for the selection of the group of other users. For example, the first element can include a slide bar, and the second element can include a list of selectable groups of the other users. Aspects of the subject technology can also include receiving a selection of the privacy level values for the user to be set.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, certain structures and techniques have not been shown in detail so as not to obscure the disclosure.

Although certain examples provided herein describe a user's information (e.g., privacy level values) being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

User interfaces for setting privacy levels can be complex. A user may have to set multiple different privacy level values, for example regarding sharing personal information such as name, address, phone numbers, and email addresses, sharing other profile information, and sharing photographs or videos with other users. Some interfaces permit an overall designation of a general level of privacy, for example ranging from "high" to "low." However, the meanings of these general levels may not correspond to user expectations, especially when different users' varying expectations are considered.

The present technology attempts to address the foregoing issues through a computer-implemented methods and systems for setting privacy level values for a user. The subject technology provides for receiving a designation of a relative privacy level for the user, receiving a selection of a group of other users for the user, with plural sets of privacy level values associated with the group of other users, and setting the privacy level values for the user based on the designation of the relative privacy level and the plural sets of privacy level values associated with the selected group of other users.

A relative privacy level can be designated by a user in the form of a percentage value or a relative description. Examples of the relative description include high, medium, low, most private, more private, private, less private, and least private. The selection of the group of other users can be from various sized groups of the other users, for example friends, friends of friends, users within a political entity, users within a social circle, or all other users for whom privacy level values are available. In some aspects, the selection can be from preset groups of users or from users grouped through individual selection by the user, for example from the user's contacts or user groups.

Each individual privacy level can be set relative to the individual privacy levels of a designated group taken as a whole. For example, if a user selects a relative privacy level of "80%" and designates "friends of friends" as the group of other users, then the individual privacy levels for the user can be set to (at least) the 80th percentile of "privateness" for each privacy level within that selected group. If cell phone number visibility is set by 13% of "friends of friends" to be visible to "everyone," 82% to be visible to "only friends," and 5% to be available to "only the user," then the 80th percentile of privateness for the cell phone visibility privacy level would be visibility to "only friends." Likewise, if address visibility is set by 10% of "friends of friends" to be visible to "nobody" and 90% to be visible to "everyone," then the 80th percentile for the address visibility privacy level would be visibility to "everyone." As a result, the user's cell phone number visibility privacy level would be set to "friends of friends," and the user's address visibility privacy level would be set to "everyone."

Alternatively, each individual privacy level can set relative to one of the group of other users' complete set of individual privates level values, with that user selected based on the designated relative privacy level. For example, if a user selects a relative privacy level of 75% and designates a group with 10 members as the group of other users, then the individual privacy levels for the user can be set to the privacy levels for the seventh or eighth most private user in the group. Ranking the users in the group can be performed by averaging the individual privacy level values for each user and comparing the averages, applying a weighted average that gives more weight to certain privacy levels and comparing the weighted averages, or using any other statistical or mathematical technique. If privacy levels are represented by numeric values, then the user's individual privacy levels can be set to the median, mean, or some other mathematical combination of the privacy levels for some number of the group of other users ranked as having privacy levels near the selected relative privacy level. Other techniques for combining the selection of a relative privacy level and the designation of the group of other users can also be used to determine privacy levels for a user.

Figure 1:
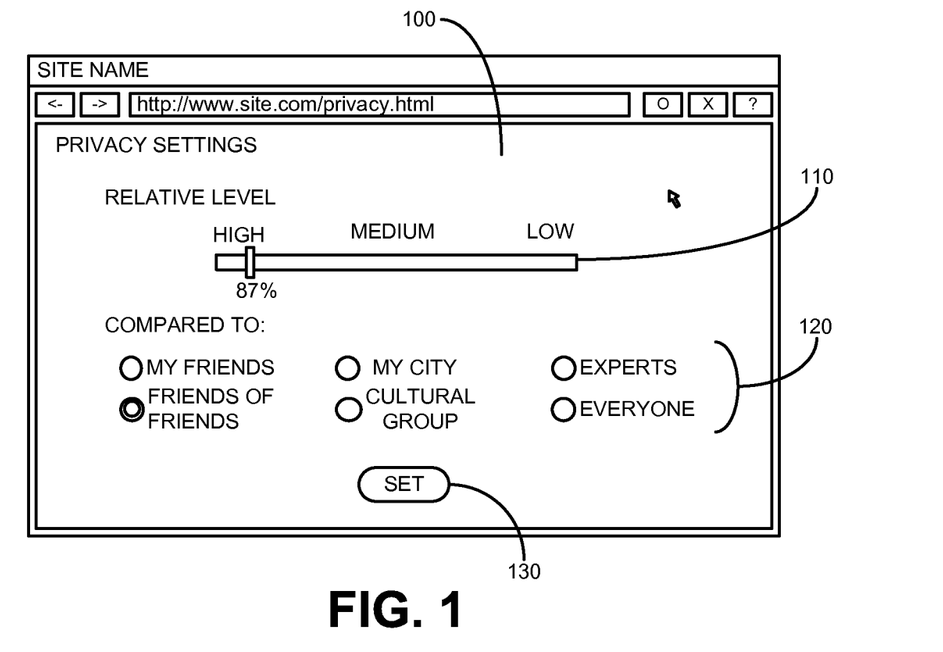
FIG. 1 illustrates an example interface for setting privacy level values according to some aspects of the disclosure.

FIG. 1 illustrates an example interface for setting privacy level values according to some aspects of the disclosure. Interface 100 permits a user to designate a relative privacy level and a group of other users. Slide bar 110 is provided for designation of the relative privacy level and a list of selectable various sized groups of the other users. Slide bar 110 is labeled with relative descriptions (e.g., "HIGH," "MEDIUM," and "LOW") of privacy levels and also a percentage value (e.g., "87%") for the position of the slide on the slide bar. In other aspects, the slide can be labeled with percentages, with different relative descriptions (e.g., ranging from "most private" to "least private"), or in some other manner, and the designation of the position of the slide bar can be shown in different ways or not at all. In addition, the relative privacy level can be set using any interface that permits designation of a relative term, value, or indicator.

Interface 100 also provides area 120 for selection of a group of other users. Area 200 is shown with selectable buttons for selection of one of the displayed groups. The groups in FIG. 1 have various sizes and include friends, friends of friends, users within a political entity (e.g., "MY CITY"), a cultural group, experts, and all other users for whom the associated privacy level values are available. In some aspects, the groups of users that are presented for selection can be restricted to those having at least a minimum number of members, for example 10, 25, 100, or 1,000 members. So restricting the groups of users can help ensure that a variety of privacy value settings are available to the user according to aspects of the disclosure. Furthermore, the subject technology is not limited to the groups of users shown in FIG. 1. Some, all, or none of these groups can be presented to a user for selection, and other groups can be presented as well. Likewise, the subject technology is not limited to the selection mechanism shown in FIG. 1. Any mechanism can be provided for selection of one of the presented groups.

Once a user is satisfied with their designation of a relative privacy level and selection of a group of users, the user can set their privacy levels by clicking on activation button 130. Any other activation mechanism can be provided for activating the process of setting the user's privacy levels based on the user's choices.

Figure 2:
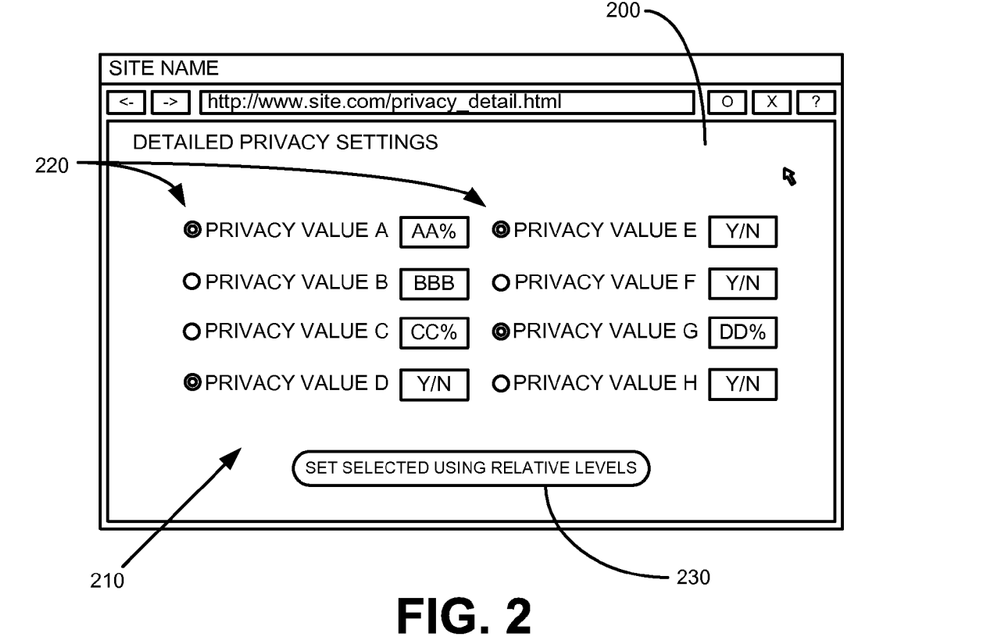
FIG. 2 illustrates an example interface for modifying individual privacy levels according to some aspects of the disclosure.

Individual privacy levels also can be modified by a user, for example after privacy levels have been set using an interface such as the one shown in FIG. 1. FIG. 2 illustrates example interface 200 for modifying individual privacy levels according to some aspects of the disclosure. Interface 200 shows individual privacy setting labels and levels for a user in area 210, for example as set based on user input to interface 100 in FIG. 1. Various different types of privacy level values are shown, for example values set as a percentage, values set as a number (i.e., "BBB"), and values set as yes/no answers (i.e., "Y/N"). The user can modify these levels individually according to aspects of the disclosure. The privacy values that can be set or modified according to the subject technology are not limited to the types shown in FIG. 2. In some aspects, some of the privacy setting labels and levels can be selected for further modification of the associated values using relative privacy level selections as described in this disclosure. Selection buttons 220 and activation button 230 are shown in FIG.

2 for initiating this operation. Upon activation button 230 being clicked, an interface such as the one shown in FIG. 1 can be provided for further modifying the privacy level values for the selected ones of the labels and levels.

Figure 3:
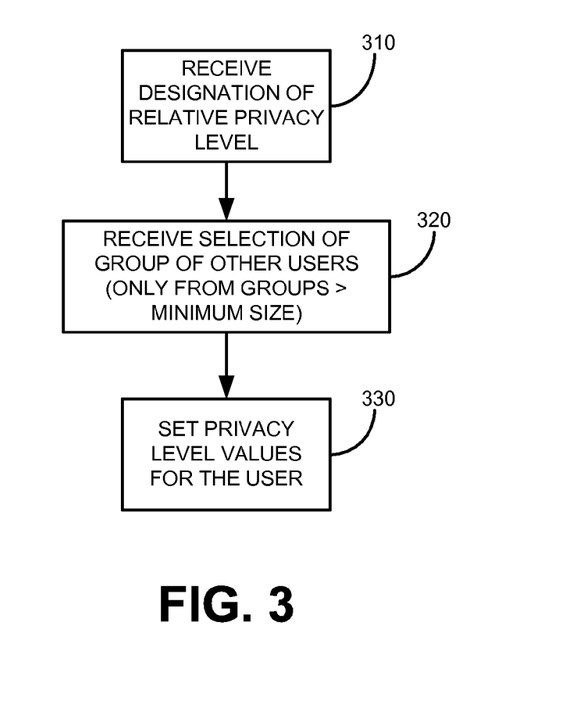
FIG. 3 is a flowchart of a sample method for setting privacy level values according to some aspects of the disclosure.

FIG. 3 is a flowchart of a sample method for setting privacy level values according to some aspects of the disclosure. A designation of a relative privacy level is received in step 310. A selection of a group of other users is received in step 320. In some aspects, only groups of users with a least a minimum number of members made available to a user for selection. Both steps 310 and 320 can be performed through a graphical interface such as the one shown in FIG. 1, which can be display on a user's client device based on data from a server device. These steps also can be performed through other interfaces presented on other computing devices.

Privacy level values for a user are set in step 330 based on the designation of the relative privacy level and the plural sets of privacy level values associated with the selected group of other users. In some aspects, the relative privacy level and group designation can be applied globally to all of a user's privacy level values. In other aspects, the relative level and group can be applied to set groups of privacy level values (e.g., all values dealing with contact information, all values related to photos, or the like) or to set individual privacy level values. Portions of these aspects can be combined, for example in the form of overriding previously set values or in the form of settings affecting smaller groups of values overriding settings affecting larger groups of values.

Figure 4:
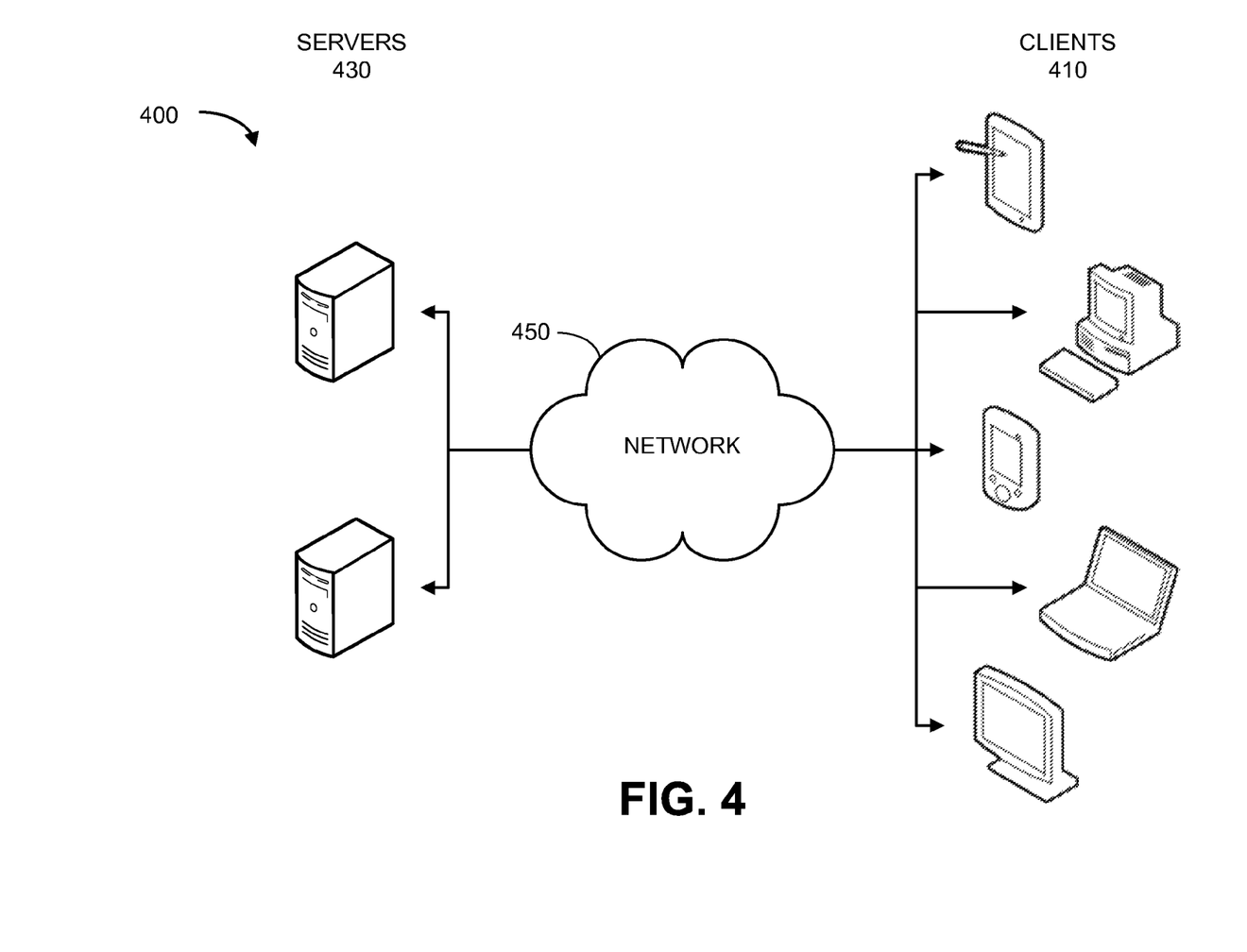
FIG. 4 illustrates an example of an architecture for setting privacy level values according to some aspects of the disclosure.

FIG. 4 illustrates an example of architecture 400 used to set privacy level values for a user according to certain aspects of the disclosure. The architecture 400 includes servers 430 and clients 410 connected over a network 450. One of the many servers 430 is configured to host instructions and data, including without limitation instructions for setting privacy level values for a user using privacy level values for groups of users according to aspects of the disclosure. Alternatively, multiple servers 430 can host these data and instructions (or portions thereof) for purposes of load balancing, or one of the many clients can execute the instruction without the assistance of a server.

Clients 410 and servers 430 can be any computing devices having processing hardware, memory, and communications capability necessary to perform some or all of the operations disclosed herein. Clients 410 to which servers 430 are connected over the network 450 can be, for example, desktop computers, mobile computers, tablet computers (e.g., including e-book readers), mobile devices (e.g., a smartphones or personal digital assistants), set top boxes (e.g., for a television with one or more processors coupled thereto and/or embedded therein), video game consoles, or any other devices having memory, processing hardware, and communications capabilities for setting privacy level values for a user according to certain aspects of this disclosure.

The network 450 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, a mobile phone network, the Internet, and the like. Further, the network can include, but is not limited to, any one or more network topologies such as a bus network, a star network, a ring network, a mesh network, a star-bus network, tree or hierarchical network, and the like.

Figure 5:
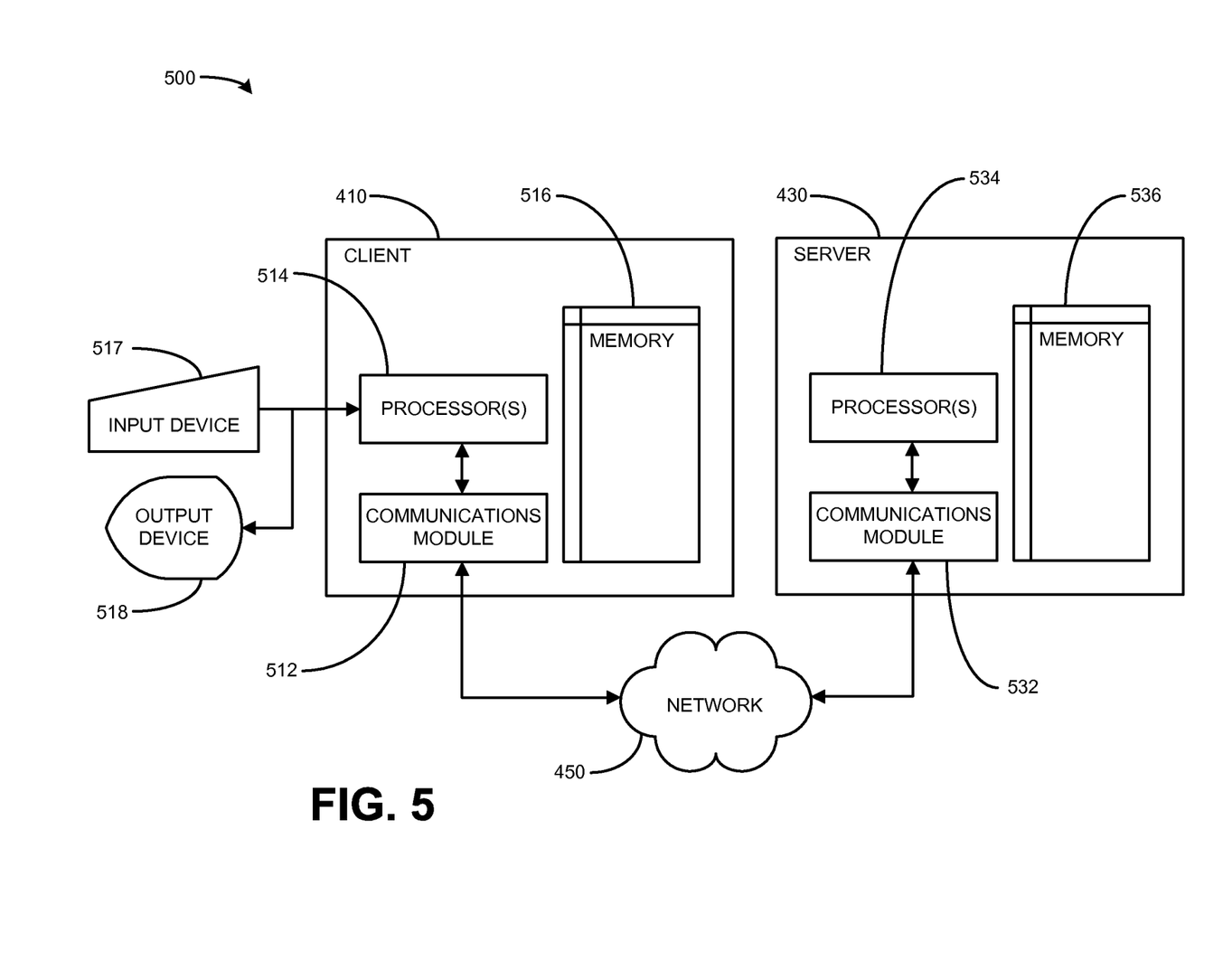
FIG. 5 is a block diagram illustrating examples of a client and a server from the architecture of FIG. 4 according to certain aspects of the disclosure.

FIG. 5 is a block diagram 500 illustrating examples of client 410 and server 430 in architecture 400 of FIG. 4 according to certain aspects of the disclosure. Client 410 and server 430 are connected over the network 450 via respective communications modules 512 and 532. Communications modules 512 and 532 are configured to interface with network 450 to send and receive information, such as data, requests, responses, and commands, to other devices on the network. Communications modules 512 and 532 can be, for example, wireless transceivers, modems or Ethernet cards.

Both client 410 and server 430 can include processing hardware and some form of memory. In FIG. 5, client 410 includes processor 514 and memory 516, and server 430 includes processor 534 and memory 536. Memory 516 and 536 can be volatile or non-volatile memory. Client 410 also can include input device 517 and output device 518 for accepting input from and providing output to a user. Server 430 also can include such input and output devices.

Figure 6:
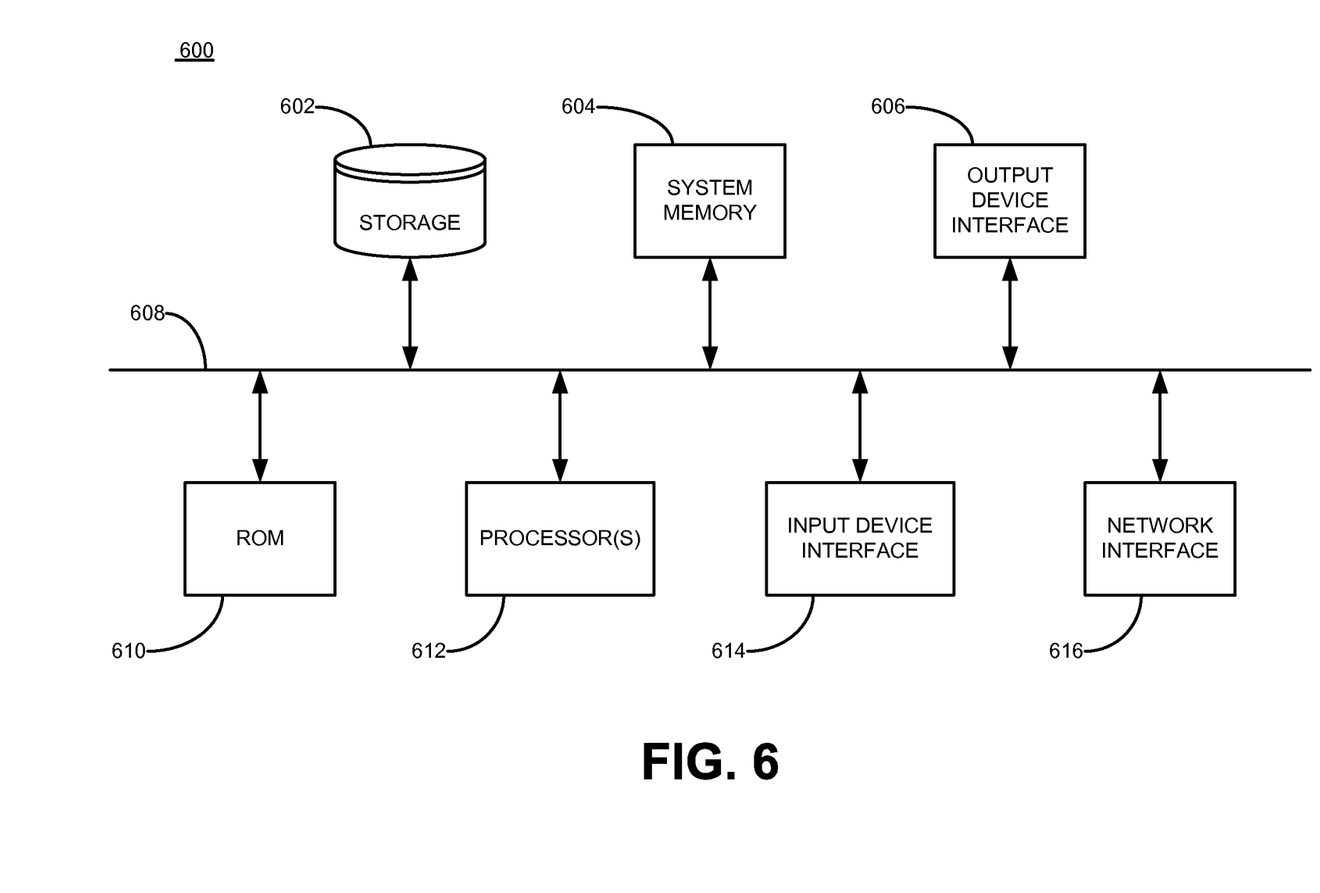
FIG. 6 conceptually illustrates an example of an electronic system with which some aspects of the subject technology can be implemented.

FIG. 6 conceptually illustrates an example of an electronic system with which some aspects of the subject technology can be implemented. Electronic system 600 can be a computer, phone, PDA, or any other sort of electronic device, including but not limited to client 410 and server 430. Electronic system 600 can also be embedded in another device, for example, and without limitation, a mobile telephone, a personal digital assistant (PDA), a mobile audio player, a Global Positioning System (GPS) receiver, a video game console, a television set top box, a client such as client 410, and/or a server such as server 430.

Such an electronic system can include various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units can include instructions for setting privacy level values for a user. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers such as network 450. Any or all components of electronic system 600 can be used in conjunction with the subject disclosure.

The operations described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., communication network 650) can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more network topologies such as a bus network, a star network, a ring network, a mesh network, a star-bus network, tree or hierarchical network, and the like. The communications modules can be, for example, modems or Ethernet cards.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
 receiving a designation of a relative privacy level for a first user;
 receiving a selection of a group of second users for the first user,
 wherein the second users within the selected group have individual privacy level values,
 wherein the relative privacy level for the first user corresponds to a user-specified level, relative to the individual privacy level values of the selected group, at which to set privacy level values for the first user, and
 wherein each privacy level value for the first user corresponds to a respective one of the individual privacy level values of the selected group; and
 setting, using one or more processors and for each privacy level value for the first user, the privacy level value for the first user based on the designation of the relative privacy level and the respective individual privacy level value of the selected group of second users.

2. The method of claim 1, wherein the designation of the relative privacy level comprises a percentage value.

3. The method of claim 1, wherein the designation of the relative privacy level comprises a relative description.

4. The method of claim 1, wherein the selection of the group of the second users comprises a selection from various sized groups of the second users.

5. The method of claim 1, further comprising presenting, for display to the first user, an interface that includes a first element that includes options for the designation of the relative privacy level and a second element that includes options for the selection of the group of second users.

6. The method of claim 5, wherein the first element comprises a slide bar, and the second element comprises a list of selectable groups of the second users.

7. The method of claim 1, further comprising presenting, for display to the first user, an interface that includes indications of the privacy level values for the first user.

8. The method of claim 7, further comprising receiving individual modification of the privacy level values for the first user.

9. The method of claim 7, further comprising receiving a selection of the privacy level values for the first user to be set based on the designation of the relative privacy level and the individual privacy level values of the selected group of second users.

10. A system comprising:
 one or more processors; and
 a machine-readable medium comprising instructions stored therein, which when executed by the one or more processors, cause the one or more processors to perform operations comprising:
  receiving a designation of a relative privacy level for a first user;
  receiving a selection of a group of second users for the first user, the group of second users having at least a predetermined number of users,
  wherein the second users within the selected group have individual privacy level values,
  wherein the relative privacy level for the first user corresponds to a user-specified level, relative to the individual privacy level values of the selected group, at which to set privacy level values for the first user, and
  wherein each privacy level value for the first user corresponds to a respective one of the individual privacy level values of the selected group; and
  setting, for each privacy level value for the first user, the privacy level value for the first user based on the designation of the relative privacy level and the respective individual privacy level value of the selected group of second users.

11. The system of claim 10, wherein the designation of the relative privacy level comprises a percentage value.

12. The system of claim 10, wherein the designation of the relative privacy level comprises a relative description.

13. The system of claim 10, wherein the selection of the group of the second users comprises a selection from various sized groups of the second users.

14. The system of claim 10, wherein the operations further comprise presenting, for display to the first user, an interface that includes a first element that includes options for the designation of the relative privacy level and a second element that includes options for the selection of the group of second users.

15. The system of claim 14, wherein the first element comprises a slide bar, and the second element comprises a list of selectable groups of the second users.

16. The system of claim 10, wherein the operations further comprise presenting, for display to the first user, an interface that includes indications of the privacy level values for the first user.

17. The system of claim 16, wherein the operations further comprise receiving individual modification of the privacy level values for the first user.

18. The system of claim 16, wherein the operations further comprise receiving a selection of the privacy level values for the first user to be set based on the designation of the relative privacy level and the individual privacy level values of the selected group of second users.

19. A non-transitory machine-readable medium comprising instructions stored therein, which when executed by a machine, cause the machine to perform operations comprising:
- receiving a designation of a relative privacy level for a first user;
- receiving a selection of a group of second users for the first user, wherein the second users within the selected group have individual privacy level values, and wherein the relative privacy level for the first user corresponds to a user-specified level, relative to the individual privacy level values of the selected group, at which to set privacy level values for the first user;
- ranking the second users within the selected group based on the respective individual privacy level values for the second users; and
- setting the privacy level values for the first user based on the designation of the relative privacy level and on the individual privacy level values of the selected group of second users as ranked.

20. The non-transitory machine-readable medium of claim 19, wherein the designation of the relative privacy level comprises a percentage value.

\* \* \* \* \*